United States Patent [19]

Walker et al.

[11] Patent Number: 4,665,347

[45] Date of Patent: May 12, 1987

[54] CIRCUIT FOR PRODUCING THE OPERATING VOLTAGES AND THE HORIZONTAL-DEFLECTION CURRENT FOR PICTURE-REPRODUCING EQUIPMENT

[75] Inventors: Michael Walker, Baltmannsweiler; Ladislav Holanda, Esslingen, both of Fed. Rep. of Germany

[73] Assignee: International Standard Electric Corporation, New York, N.Y.

[21] Appl. No.: 632,817

[22] Filed: Jul. 20, 1984

[30] Foreign Application Priority Data

Jul. 22, 1983 [DE] Fed. Rep. of Germany ....... 3326434

[51] Int. Cl.⁴ .......................................... H01J 29/70
[52] U.S. Cl. .................................. 315/411; 315/408; 315/399; 315/371
[58] Field of Search ............... 315/408, 411, 387, 399, 315/370, 371

[56] References Cited

U.S. PATENT DOCUMENTS

| | | | |
|---|---|---|---|
| 4,144,479 | 3/1979 | Farina et al. | 315/399 |
| 4,240,012 | 12/1980 | Willis | 315/411 |
| 4,305,023 | 12/1981 | Willis | 315/371 |
| 4,316,127 | 2/1982 | Lamoureux | 315/408 |
| 4,390,820 | 6/1983 | Willis | 315/411 |
| 4,516,058 | 5/1985 | Haferl | 315/408 |

Primary Examiner—Thomas H. Tarcza
Assistant Examiner—D. Cain
Attorney, Agent, or Firm—Donald J. Lenkszus

[57] ABSTRACT

In picture-reproducing equipment with higher scanning frequencies (e.g., flicker-free television, visual display unit), the generation of the horizontal-deflection current is separated in frequency from the generation of the operating voltages by supplying the horizontal-deflection circuit from a DC voltage source which is part of the voltage power supply providing the operating voltages. The supply circuit is preferably connected to the grounded deflection capacitor. This makes it possible to influence the picture geometry in a simple manner, particularly to perform horizontal pincushion correction.

11 Claims, 1 Drawing Figure

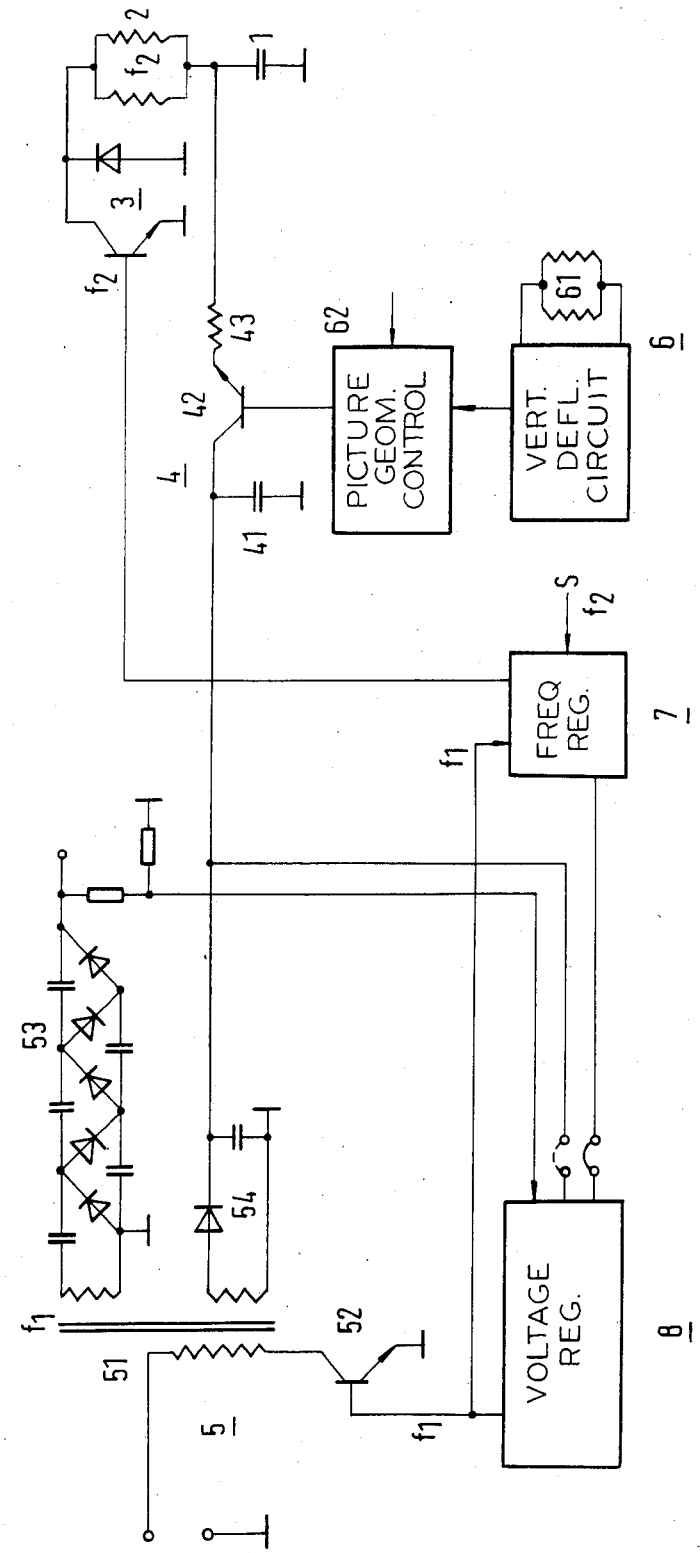

CIRCUIT FOR PRODUCING THE OPERATING VOLTAGES AND THE HORIZONTAL-DEFLECTION CURRENT FOR PICTURE-REPRODUCING EQUIPMENT

BACKGROUND OF THE INVENTION

The present invention relates to a circuit for producing the operating voltages and the horizontal-deflection current for picture-reproducing equipment.

In particular the invention relates to such a circuit for use in equipment comprising a picture tube, a horizontal-deflection circuit including a series combination formed by a deflection capacitor and the horizontal-deflection coils and of a bidirectional switch in parallel with the series combination, a supply circuit supplying energy to the horizontal-deflection circuit, a vertical-deflection circuit, and a power supply providing the high voltage necessary to operate the picture tube and further operating voltages.

Picture tubes of the type employed in television receivers are increasingly being used for other applications. Even the picture tube in a television receiver is used to reproduce not only television pictures but also teletext or videotex information and programmable video games, for example. Picture tubes similar to those in the television receiver are also used in monitors and visual display units for displaying graphs and characters in data processing or office communication systems. The different displays and in particular those having large, monochromatic areas, and sharp boundaries require higher resolution and a reduced flicker. Both can be achieved by increasing the scanning frequencies.

The horizontal-deflection coils and a deflection capacitor form a resonant circuit in which the energy does not oscillate freely, however. The energy is so influenced by a bidirectional electronic switch (such as a thyristor or transistor with a diode connected in inverse parallel) that a horizontal-frequency sawtooth current is obtained. This resonant circuit dissipates electrical energy; the lost energy is periodically resupplied to the circuit by a switch.

The high voltage necessary to operate the picture tube is produced by a high-voltage transformer followed by a voltage-multiplying circuit. The high-voltage transformer is operated at the horizontal scanning rate; to this end, it is connected in parallel with the horizontal-deflection circuit. In general, further voltages required to operate the set are produced by means of the high-voltage transformer, too.

To increase the scanning frequencies, which is necessary for many applications, involves increasing the operating frequency of the high-voltage transformer. In principle, high frequencies are desirable for the operation of the high-voltage transformer, but frequencies above approximately 15–20 kHz should be avoided.

SUMMARY OF THE INVENTION

One object of the invention is to provide a circuit with which the operating voltages, particularly the high voltage, and the horizontal-deflection current can be produced even at high scanning rates.

According to the invention, the supply circuit supplying energy to the horizontal-deflection circuit is connected to a source which provides a smoothed DC voltage and forms part of the voltage power supply. Because the losses of the horizontal-deflection circuit are replaced by a DC voltage source, the horizontal-deflection current is at a different frequency from that at which the high-voltage transformer is operated.

The circuit according to the invention has the following additional advantages. The deflection current is largely independent of brightness variations, hum, etc. The circuit is highly flexible when it has to be adapted to other deflection systems and scanning frequencies. As the high voltage and the other operating voltages do not interact with the very high scanning frequencies, the spurious radiation does not increase with the scanning frequencies.

If the deflection capacitor of the circuit according to the invention is grounded, it is possible to feed the lost energy into the circuit at the ungrounded end of the capacitor through an inductance which is considerably smaller than in conventional circuits. The supply circuit, which is to compensate for the lost energy, can be designed to permit a correction of picture geometry, particularly horizontal pincushion correction. The two last-mentioned advantages also allow the circuit according to the invention to be used to advantage at conventional scanning rates.

BRIEF DESCRIPTION OF THE DRAWING

An embodiment of the invention will now be explained in more detail with reference to the accompanying drawing which is a block diagram of an embodiment of a circuit according to the invention for producing the operating voltages and the horiztonal-deflection current for picture-reproducing equipment.

DETAILED DESCRIPTION

Horizontal-deflection coils 2 and a deflection capacitor 1 form a series-resonant circuit which is shunted by a bidirectional switch 3 consisting of a transistor and a diode connected in inverse parallel with this transistor. By driving the bidirectional switch 3 at the horizontal scanning frequency f2, a sawtooth current of frequency f2 is generated in the horizontal-deflection circuit 1, 2, 3. The energy dissipated in the horizontal-deflection circuit 1, 2, 3 is compensated for by a supply circuit 4. The supply circuit 4 consists of a smoothing capacitor 41, a regulating transistor 42, and a series inductance 43. Supply circuit 4 is connected to a voltage power supply 5.

The voltage power supply 5 is shown as a switching power supply consisting of a transformer 51, a switching transistor 52, a high-voltage portion 53, and a DC voltage source 54. The DC voltage source 54 produces the operating voltage for the supply circuit 4. There may be further DC voltage sources for providing further operating voltages.

Also shown is a vertical-deflection circuit 6 with two vertical-deflection coils 61. The regulating transistor 42 of the supply circuit 4 is controlled by the vertical-deflection circuit 6 via a picture-geometry controller 62, so that horizontal pincushion correction is readily possible. The picture geometry can be additionally influenced through further inputs and the internal circuitry of the picture-geometry controller 62. This is especially simple in the circuit according to the invention since energy can be fed into the circuit at the ungrounded end of the grounded deflection capacitor 6. The series inductance 43 can be quite small, so that the picture geometry is readily influenceable.

The switching transistor 52 is driven by a voltage regulator 8 with a square-wave pulse. The pulse is characterized by two quantities, namely pulse duration and pulse spacing or, equivalently, pulse duration and pulse-repetition rate. It is thus possible, for example, to hold two different operating voltages, preferably including the high voltage, constant independent of one another. This requires that these two operating voltages be suitably separated from each other, e.g., by oppositely poling the rectifying diodes or the associated windings of the transformer 51. As a rule, however, the switching frequency f1 of the switching transistor 52 will be predetermined. Thus, there remains only one degree of freedom, which is used to hold one of the operating voltages, preferably the high voltage, constant.

In the example shown, the switching frequency f1 is determined by a frequency regulator 7. As can be seen, a reference signal derived from an operating voltage can be applied to one of the inputs of the voltage regulator 8, or a reference signal derived in the frequency regulator 7 can be applied to another input of the regulator 8, while a further input is presented with a reference signal derived from a further operating voltage, preferably the high voltage. The frequency regulator 7 is presented with a sync signal S containing the horizontal scanning frequency f2. It drives the horizontal-deflection circuit via the bidirectional switch 3 at the horizontal scanning frequency f2, and the switching transistor 52 via the voltage regulator 8 at the switching frequency f1. The latter is advantageously chosen so that it and the horizontal scanning frequency f2 are integral multiples of a common fundamental frequency. In the simplest case, the horizontal scanning frequency f2 can be made an integral multiple of the switching frequency f1 by means of a divider or a phase-locked loop.

What is claimed is:

1. A circuit for producing the operating voltages and the horizontal-deflection current for picture-reproducing equipment such as a picture tube comprising:
   a horizontal-deflection circuit comprising a series combination formed by a deflection capacitor and horizontal-deflection coils, and a bidirectional switch in parallel with said series combination;
   a vertical-deflection circuit;
   a voltage power supply providing the high voltage necessary to operate said picture tube, and further operating voltages;
   a supply circuit supplying energy to said horizontal-deflection circuit, said supply circuit being connected to a source providing a smoothed DC voltage, said source forming part of said voltage power supply;
   said deflection capacitor having one terminal coupled to ground and a second terminal;
   said horizontal-deflection coils being coupled to said deflection capacitor second terminal; and
   said supply circuit being connected to said deflection capacitor second terminal.

2. A circuit in accordance with claim 1, wherein:
   said voltage power supply is a switching power supply.

3. A circuit in accordance with claim 1 wherein:
   said energy delivered by said supply circuit can be influenced to correct the picture geometry.

4. A circuit in accordance with claim 2 wherein:
   said energy delivered by said supply circuit can be influenced to correct the picture geometry.

5. A circuit in accordance with claim 3 wherein:
   said supply circuit is so coupled to said vertical-deflection circuit that said energy delivered by said supply circuit is modulated at the vertical frequency to provide horizontal pincushion correction.

6. A circuit in accordance with claim 4 wherein:
   said supply circuit is so coupled to said vertical-deflection circuit that said energy delivered by said supply circuit is modulated at the vertical frequency to provide horizontal pincushion correction.

7. A circuit in accordance with claim 2 wherein:
   said switching power supply includes a voltage regulator which adjusts the pulse duty factor so that one of the supply voltages, preferably the high voltage, is constant, and which adjusts the switching frequency so that a further supply voltage is constant.

8. A circuit in accordance with claim 4 wherein:
   said switching power supply includes a voltage regulator which adjusts the pulse duty factor so that one of the supply voltages, preferably the high voltage, is constant, and which adjusts the switching frequency so that a further supply voltage is constant.

9. A circuit as claimed in accordance with claim 2 wherein:
   said switching power supply includes a voltage regulator which adjusts the pulse duty factor so that one of the supply voltages, preferably the high voltage, is constant, and which adjusts the switching frequency to a predetermined frequency.

10. A circuit as claimed in accordance with claim 4 wherein:
    said switching power supply includes a voltage regulator which adjusts the pulse duty factor so that one of the supply voltages, preferably the high voltage, is constant, and which adjusts the switching frequency to a predetermined frequency.

11. A circuit in accordance with claim 10 comprising:
    a frequency regulator which delivers to said voltage regulator a signal whereby the switching frequency and the horizontal scanning frequency are made integral multiples of a common fundamental frequency.

* * * * *